US012746416B2

(12) United States Patent
Yen

(10) Patent No.: US 12,746,416 B2
(45) Date of Patent: Sep. 29, 2026

(54) ESCAPE STRUCTURE

(71) Applicant: Chen Yen, Kaohsiung City (TW)

(72) Inventor: Chen Yen, Kaohsiung City (TW)

( * ) Notice: Subject to any disclaimer, the term of this patent is extended or adjusted under 35 U.S.C. 154(b) by 326 days.

(21) Appl. No.: 18/444,628

(22) Filed: Feb. 17, 2024

(65) Prior Publication Data

US 2024/0278042 A1 Aug. 22, 2024

(30) Foreign Application Priority Data

Feb. 22, 2023 (TW) ................................ 112106466

(51) Int. Cl.

| | |
|---|---|
| ***A62B 1/20*** | (2006.01) |
| ***A62B 1/02*** | (2006.01) |
| *A62B 1/00* | (2006.01) |
| *A62B 35/00* | (2006.01) |
| *E04G 21/32* | (2006.01) |

(52) U.S. Cl.

CPC .................. *A62B 1/20* (2013.01); *A62B 1/02* (2013.01); *A62B 1/00* (2013.01); *A62B 35/0062* (2013.01); *E04G 21/3261* (2013.01)

(58) Field of Classification Search

CPC ......... A62B 1/20; A62B 1/02; A62B 35/0062; A62B 1/00; E04G 21/3261

See application file for complete search history.

(56) References Cited

U.S. PATENT DOCUMENTS

| | | | | | |
|---|---|---|---|---|---|
| 607,161 | A | * | 7/1898 | Conaway ........... | A62B 35/0062 182/5 |
| 715,560 | A | * | 12/1902 | Dedrick ............... | B65G 11/088 182/48 |
| 3,831,711 | A | * | 8/1974 | Smith ...................... | A62B 1/00 182/40 |
| 4,037,685 | A | * | 7/1977 | Talucci .................... | A62B 1/20 182/48 |
| 4,267,900 | A | * | 5/1981 | Yin-Lung .......... | A62B 35/0062 182/36 |
| 5,150,765 | A | * | 9/1992 | Chen ........................ | A62B 1/20 182/48 |

(Continued)

FOREIGN PATENT DOCUMENTS

| | | | | |
|---|---|---|---|---|
| CN | 201492831 | U | * | 6/2010 |
| CN | 204447017 | U | * | 7/2015 |

(Continued)

*Primary Examiner* — Daniel P Cahn
*Assistant Examiner* — Benjamin Alexander Pezzlo
(74) *Attorney, Agent, or Firm* — Leong C. Lei

(57) ABSTRACT

An escape structure is applied to an external wall of a building and includes at least two slide bars, a plurality of foot board units, and a surround cover unit. The slide bars are mounted to the external wall of the building, and the two slide bars are spaced from each other by a distance. The plurality of foot board units are mounted to the slide bars, and the foot board units are arranged on the two slide bars in an alternate manner. The surround cover unit surrounds the slide bars to form an escape space. When a disaster (fire) occurs, an escaping person enters the escape space to follow the two slide bars to slide down in an alternate manner, and the foot board units receive the feet of the escaping person to stand thereon and provides an elastic cushioning effect.

9 Claims, 10 Drawing Sheets

(56) References Cited

U.S. PATENT DOCUMENTS

| | | | | |
|---|---|---|---|---|
| 2003/0070874 | A1* | 4/2003 | Kim | A62B 1/20 182/37 |
| 2005/0269155 | A1* | 12/2005 | Chen | A62B 35/0062 182/82 |
| 2020/0254287 | A1* | 8/2020 | Ren | A62B 5/00 |

FOREIGN PATENT DOCUMENTS

| | | | | | |
|---|---|---|---|---|---|
| CN | 204447018 | U | * | 7/2015 | |
| CN | 105288883 | A | * | 2/2016 | |
| CN | 205867329 | U | * | 1/2017 | |
| CN | 107419878 | A | * | 12/2017 | E04F 17/00 |
| CN | 111013032 | A | * | 4/2020 | H04N 23/00 |
| CN | 215084382 | U | * | 12/2021 | |
| DE | 102010046423 | A1 | * | 7/2013 | A62B 1/20 |
| DE | 102013017071 | A1 | * | 4/2015 | A62B 1/20 |
| GB | 2066211 | A | * | 7/1981 | A62B 35/0062 |
| KR | 20060105245 | A | * | 10/2006 | A62B 1/18 |
| KR | 20190101779 | A | * | 9/2019 | A62B 1/20 |
| KR | 102135003 | B1 | * | 7/2020 | B66B 17/12 |
| TW | M462124 | U | * | 9/2013 | |
| TW | I828546 | B | * | 1/2024 | A62B 1/20 |

* cited by examiner

ESCAPE STRUCTURE

BACKGROUND OF THE INVENTION

(a) Technical Field of the Invention

The present invention relates to an escape structure, and more particularly to one that provides a secured escape space for an escaping person, so that the escaping person slides down alternatively along two slide bars in the escape space to fulfill the purpose of smooth and safe descending, in a falling prevented manner, for escape.

(b) Description of the Prior Art

The change of living style makes people living together, causing excessive crowdedness in the living environment. Moreover, there are buildings in which various entertainment and dining facilities have been set up, while devoid of excellent escape equipment. All these lead to potential threats hiding everywhere.

Recently, numerous catastrophic fires occurred, causing severe loss of lives and property, this being of great sorrow. Most of the reasons for lives losing in a fire are that the first five minutes for escape are not correctly used, leading to dying of choke. For various sorts of escape equipment are commonly used currently, the operation is excessively complicated, or operation cannot be properly carried out due to panic. In addition, such escape equipment often has a very low transportation efficiency, provides little aid in urgent situations at public facility, and may become useless for buildings of relatively large heights.

In view of the above, the known escape equipment has various defects and blind spots in the design thereof, and the structure is not perfect. Thus, it is desired to have an escape structure that features high mobility, and rapid deployment, requires no special tools, and allows synchronous use by multiple person on multiple floors.

SUMMARY OF THE INVENTION

An objective of the present invention is to provide an escape structure that allows an escaping person to slide down alternatively along two slide bars in a secured escape space to achieve smooth and safe descending, in a falling prevented manner, for escape.

To achieve the above objective, the present invention provides an escape structure that is applicable to an external wall of a building. The escape structure comprises at least two slide bars, a plurality of foot board units, and a surround cover unit, wherein the slide bars are mounted to the external wall of the building and the two slide bars are spaced from each other by a distance; the plurality of foot board units are mounted to the slide bars, and the foot board units are arranged on the two slide bars in an alternate manner; and the surround cover unit surrounds the slide bars to form an escape space, and one side of the surround cover unit corresponds to an escaping site of the building for allowing an escaping person to enter and be constrained in the escape space.

When a disaster (such as fire) occurs, an escaping person moves into the escape space, and then follows the two slide bars to slide down in an alternate manner. During the course of sliding down in an alternate manner, the foot board units allow the feet of the escaping person to stand thereon to thereby achieve an effect of elastic cushioning and serve as intermediate staying sites to achieve the purposes of falling prevention and smooth and safe descending to escape.

The present invention provides the following advantages: high mobility, quick escape, no special skill required, use for synchronous escape for multiple floors and multiple persons, no use of special tools, assisting the weak to synchronously escape, simple structure, preventing falling, allowing an escape to move back to a building (structure) after escaping from a fire floor, and blocking the view to reduce an escaping person's fear of heights.

DETAILED DESCRIPTION OF THE PREFERRED EMBODIMENTS

Figure 1:
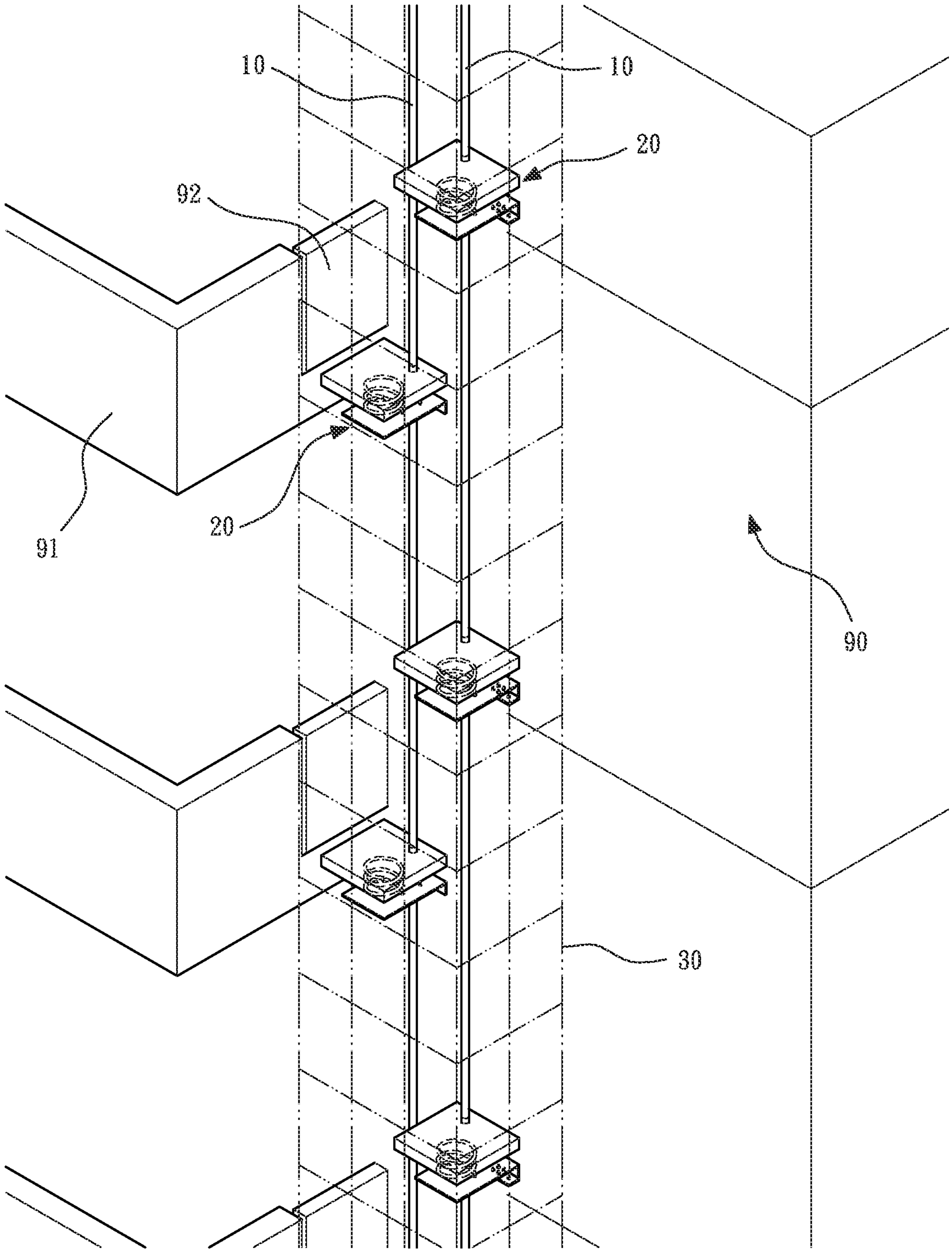
FIG. 1 is a perspective view of the present invention.
Figure 2:
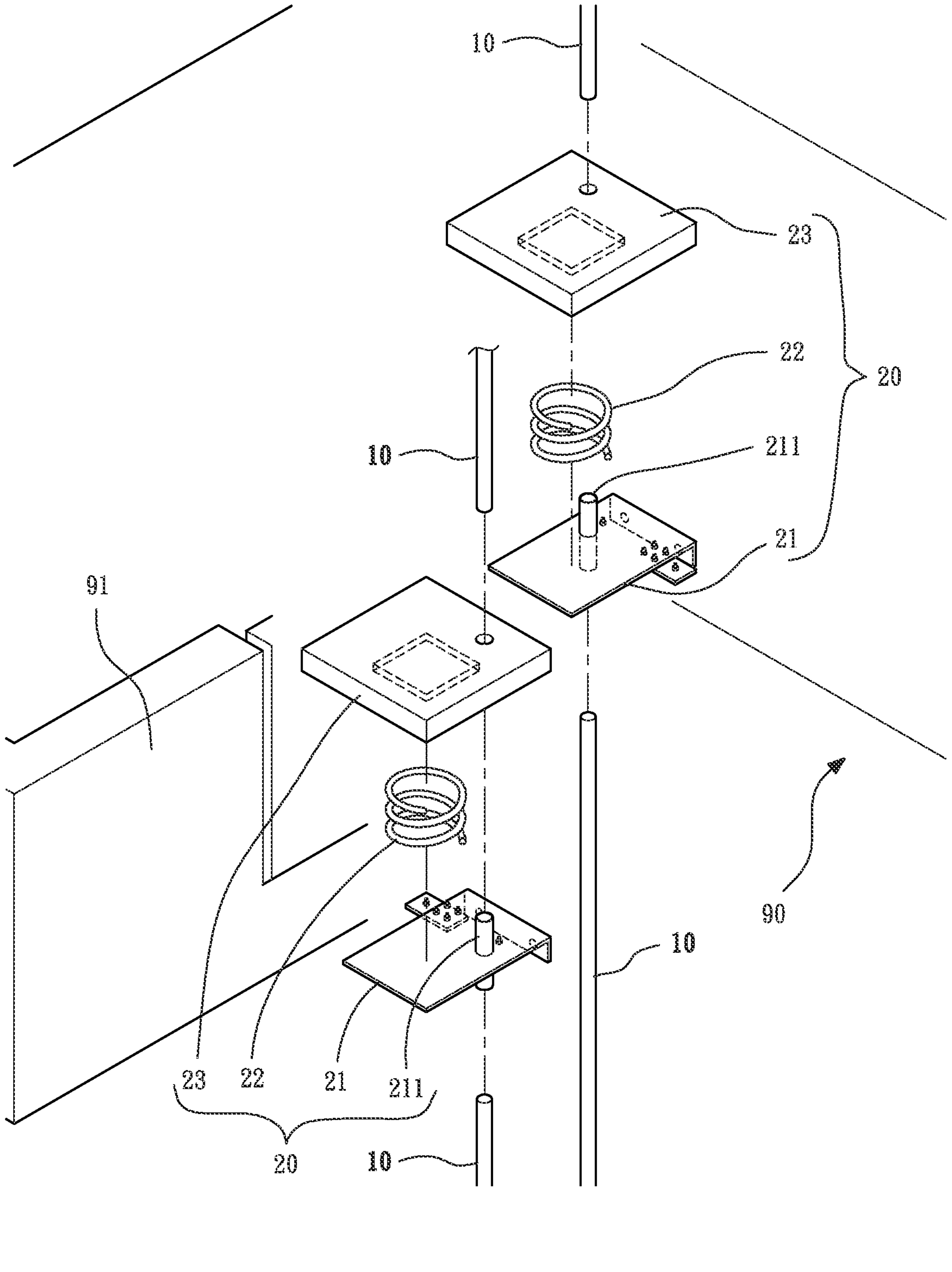
FIG. 2 is an exploded view of the present invention.
Figure 3:
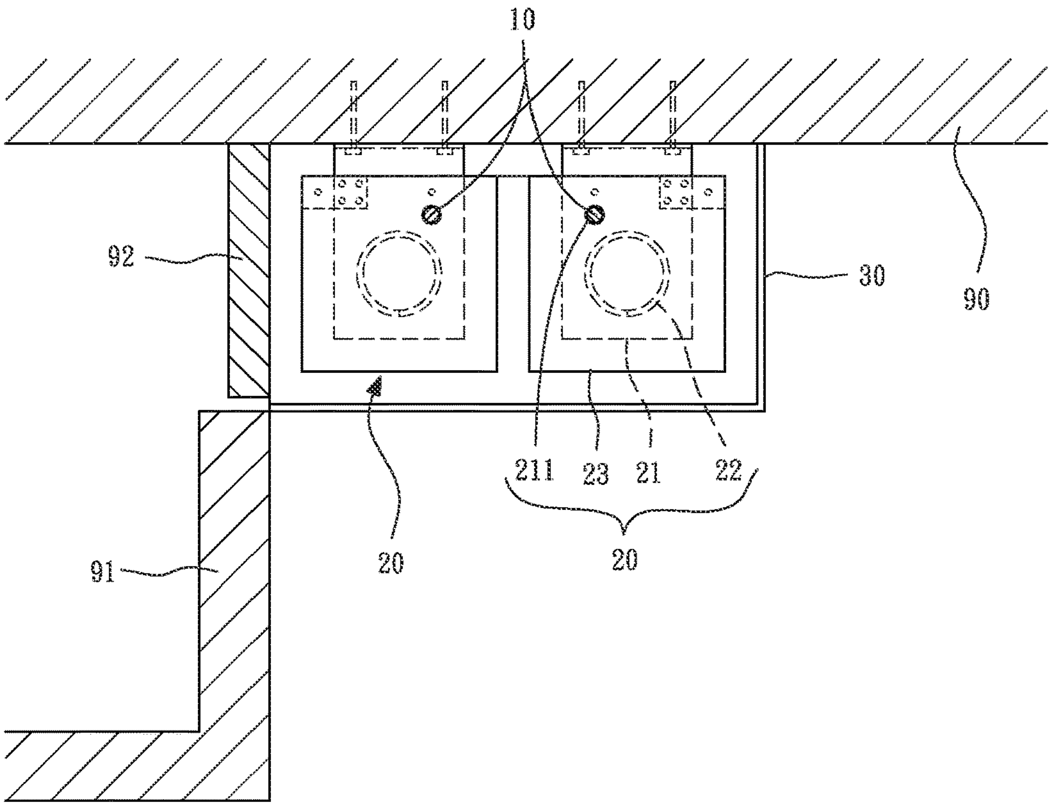
FIG. 3 is a top plan of the present invention.
Figure 4:
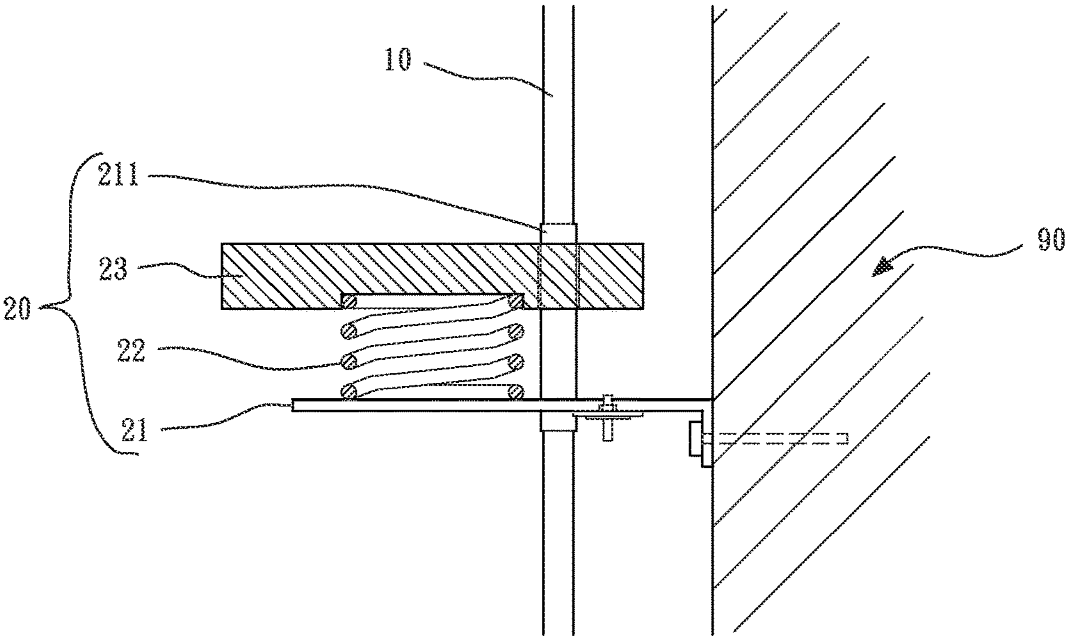
FIG. 4 is a cross-sectional view of the present invention.

Referring to FIGS. 1-4, the present invention provides an escape structure that is used on an external wall of the building 90 and has a main structure that comprises at least two slide bars 10, a plurality of foot board units 20, and a surround cover unit 30. Details are provided below:

The slide bars 10 are mounted on the external wall of the building 90 and a distance is kept between the two slide bars 10.

The foot board units 20 are arranged on the slide bars 10, and the foot board units 20 are arranged in an alternate manner on the two slide bars 10.

The surround cover unit 30 surrounds the slide bars 10 to form an escape space, and one side of the surround cover unit 30 corresponds to an escape site of the building 90 to allow an escaping person to get into and become constrained in the escape space.

In an embodiment, each of the slide bars 10 is formed in a sectioned arrangement at a site thereof mounted on the foot board units 20, and each of the foot board units 20 comprises a bottom plate 21, an elastic body 22, and a foot board 23, wherein the bottom plate 21 comprises a joining tube 211 mounted thereto by penetrating therethrough, such that upper-end and lower-end parts of the joining tube 211 respectively form an upper section portion and lower section portion respectively projecting from upper and lower sides of the bottom plate 21, wherein the upper section portion and the lower section portion of the joining tube 211 are respectively joined to separate sections of the slide bar 10. The elastic body 22 is arranged on the bottom plate 21. The foot board 23 is fit over the upper section portion of the joining tube 211 and arranged on the elastic body 22, so that when the foot board 23 receives a pressing force acting thereon, the elastic body 22 is set in a rebounding form by means of the spring force thereof. The bottom plate 21 is fixedly mounted, at one side thereof, to the external wall of the building 90, so as to thereby fix the slide bar 10 to the external wall of the building 90.

In this way, the foot board unit 20 is made in a modularized structure, which can be easily operated and efficiently combinable with the slide bars 10. And, when an escaping person steps on the foot board 23, in a manner of pressing downward from an upper side during escape, an elastic cushioning effect can be induced to reduce the influence of gravity acting on the feet to protect the feet from being hurt by stepping through directly pressing.

In an embodiment, the foot board 23 is mounted through fitting, in a sleeving manner, over the upper section portion of the joining tube 211 at a location distant from a center thereof.

In this way, the slide bar 10 is arranged at a location that is adjacent to an edge of the foot board 23 to reduce hinderance on the foot board 23 by obstacle, meaning the foot board 23 can have a relatively large stepping space that allows the feet of the escaping person to step thereon and press downward.

In an embodiment, the elastic body 22 is selected as a compression spring.

In an embodiment, the escaping site of the building 90 can be a balcony 91, and a control door 92 that is selectively openable/closable is provided on the balcony 91, so that upon opening, the control door 92 is set in connection with and makes access to the surround cover unit 30.

In this way, when no disaster occurs in regular days, the control door 92 can be set in a locked and thus closed condition and can be unlocked in case of disasters to allow the control door 92 to open so that an escaping person may easily get into the surround cover unit 30 for escaping away from the disaster site.

Figure 5:
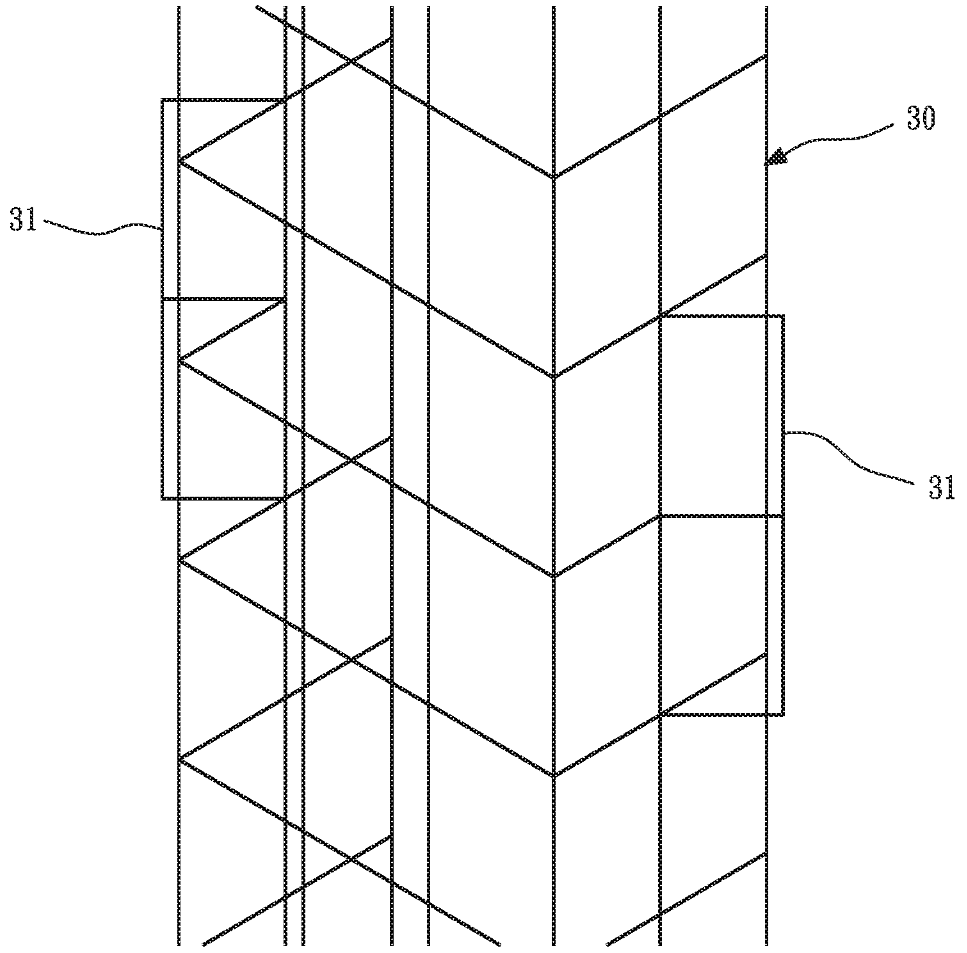
FIG. 5 is a perspective view showing a surround cover unit of the present invention.

Referring to FIG. 5, in an embodiment, the surround cover unit 30 can be in the form of a grid-like frame including multiple control doors 31 that are openable/closable to selectively allow an escaping person to enter or exit.

The above provides a description of constituent components of the present invention, and a way of assembling thereof. In the following, an example of operation and use of the present invention, and features and efficacy thereof, will be described.

Figure 6:
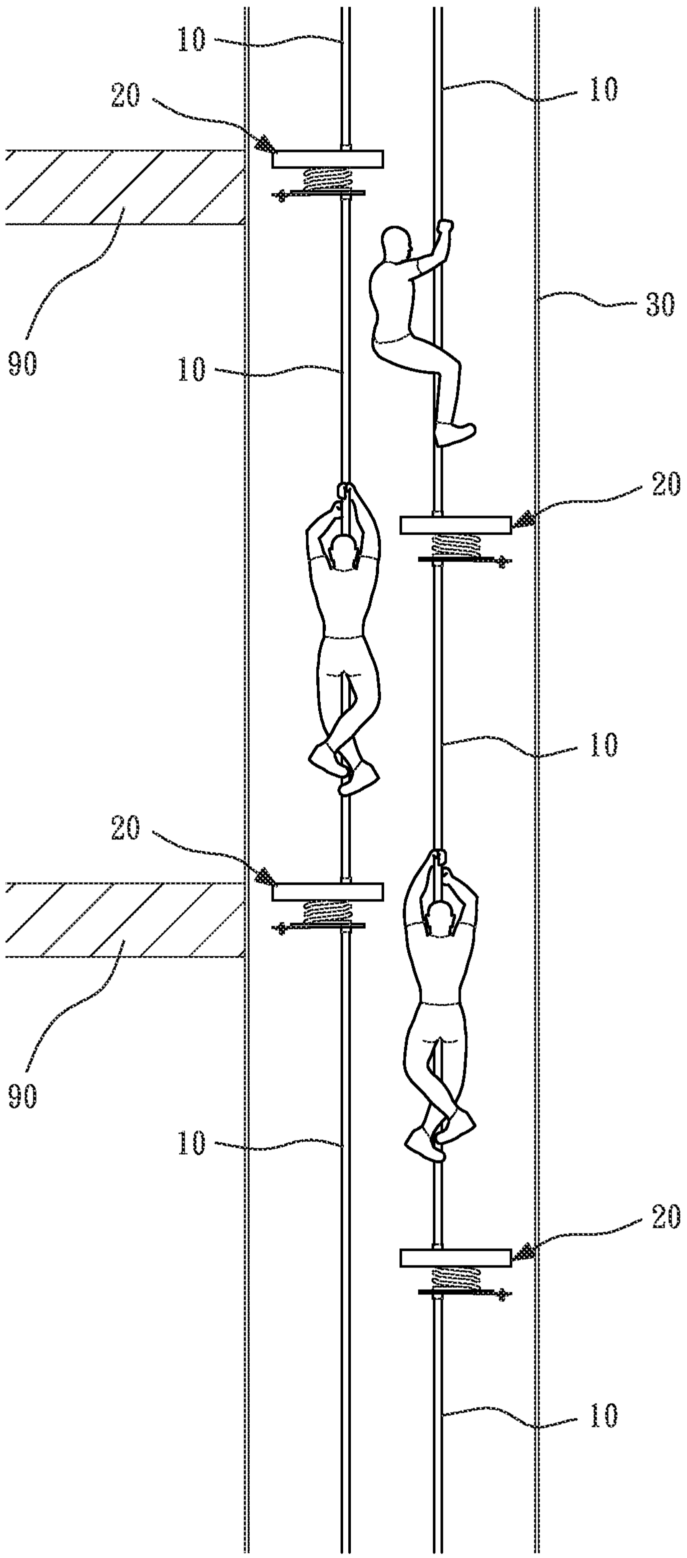
FIG. 6 is a view showing an example of use of the present invention.

Referring to FIG. 6, when a disaster occurs, an escaping person may move into the escape space defined in the surround cover unit 30, and then follow the two slide bars 10 to slide down in an alternate manner. During the course of sliding down in an alternate manner, the foot board units 20 allow the feet of the escaping person to stand thereon to thereby achieve an effect of elastic cushioning and serve as intermediate staying sites to achieve the purposes of falling prevention and smooth and safe descending to escape.

Figure 7:
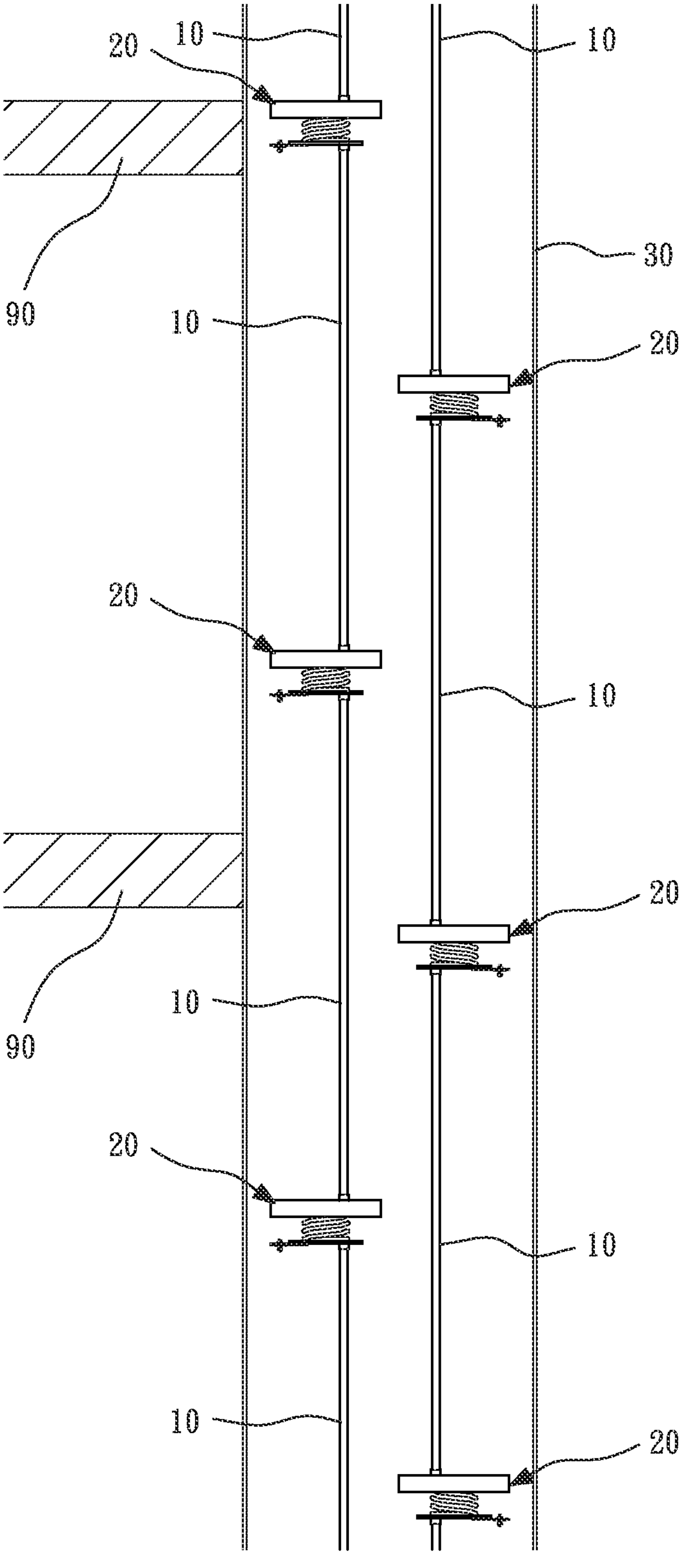
FIG. 7 is a view showing an embodiment of another structure of the present invention.

Referring to FIG. 7, in an embodiment, a height distance between adjacent ones of the plurality of foot board units 20 is reduced.

As such, at least the following advantages can be achieved:

(1) The descending height is reduced for the escaping person, and potential damage is lowered.

(2) Fear of the escaping person that occurs during descending can be lowered.

(3) Young and physically weak persons may escape by themselves.

(4) Additional assisting slow-descending devices, which can be structured as counterweight water bags, are not necessary.

(5) Excessive accessories can be removed, thereby further reducing the installation cost.

Figure 8:
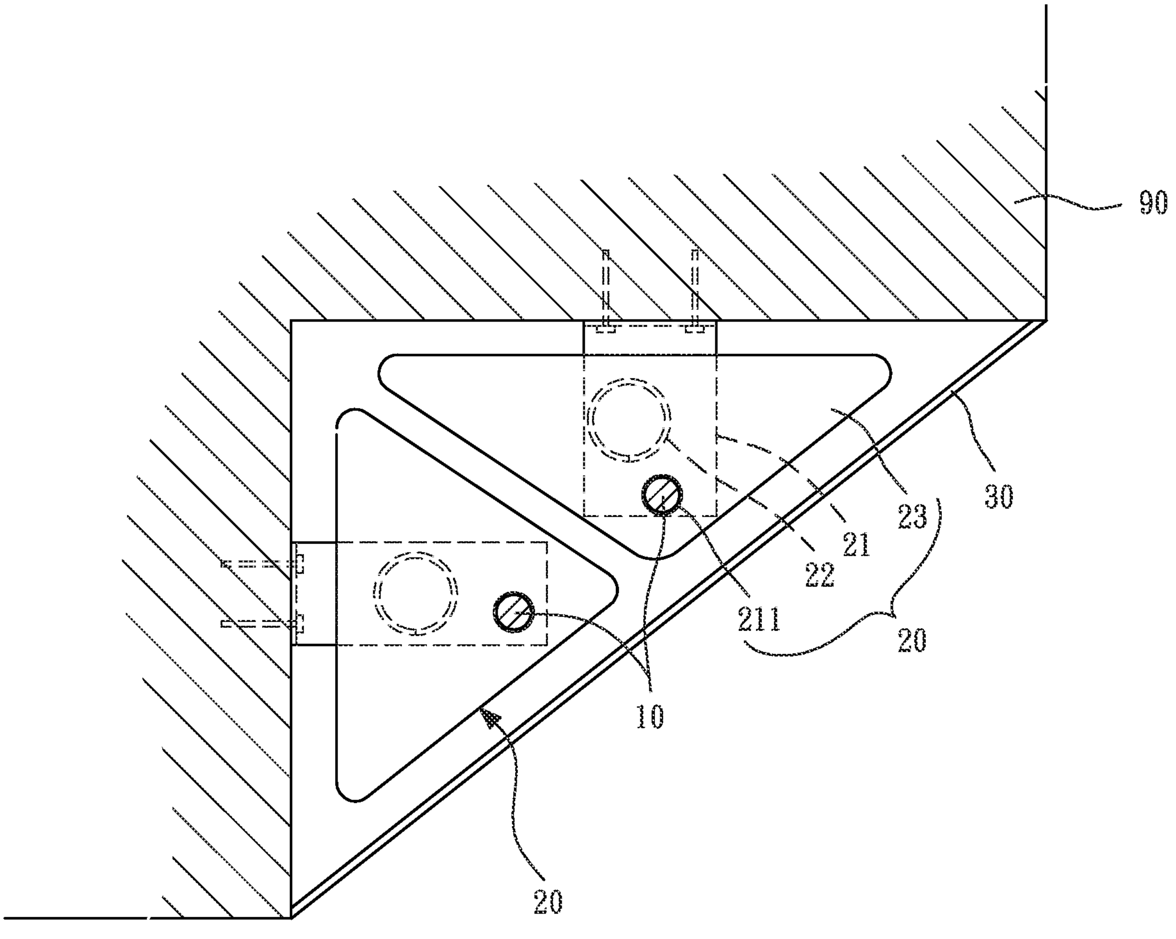
FIG. 8 is a top plan view showing an embodiment of a further structure of the present invention.

Referring to FIG. 8, in an embodiment, the foot board units 20 and the surround cover unit 30 have a top-plan view shape that is one of a triangle, a rectangle, a circle, or other shapes.

In FIG. 8, the top plan view shape of the surround cover unit 30 being a triangle is illustrated as an example.

As such, the present invention may use only a narrow corner of the external wall of the building 90, provided the external wall of the building 90 has a proper space for installation two or multiple slide bars 10 (including associated assisting devices), and this is sufficient to ensure and allow an escaping person to follow the two slide bars 10 to safely descend in an alternate manner.

Figure 9:
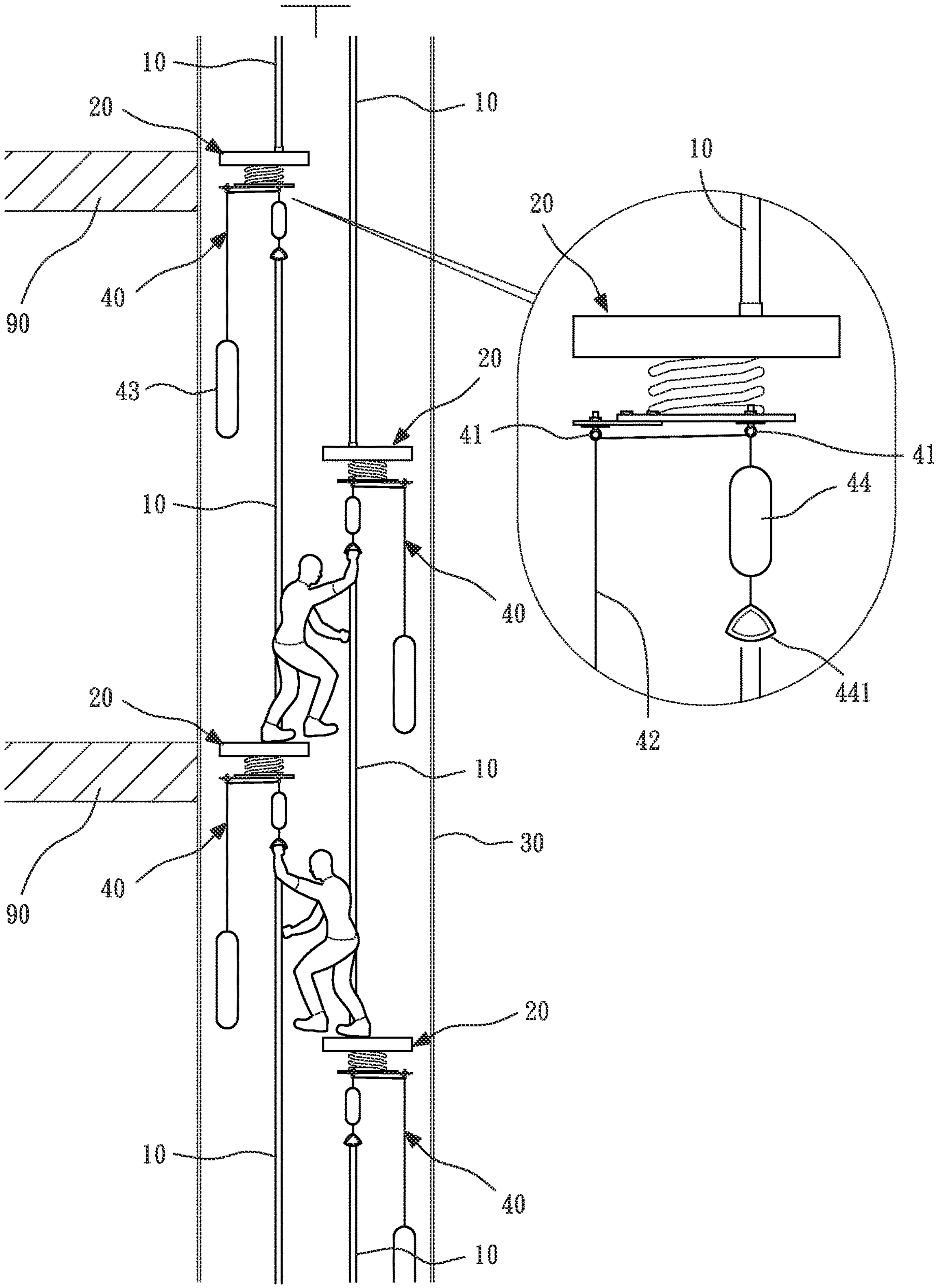
FIG. 9 is a view showing an example of use of the present invention including a counterweight device.
Figure 10:
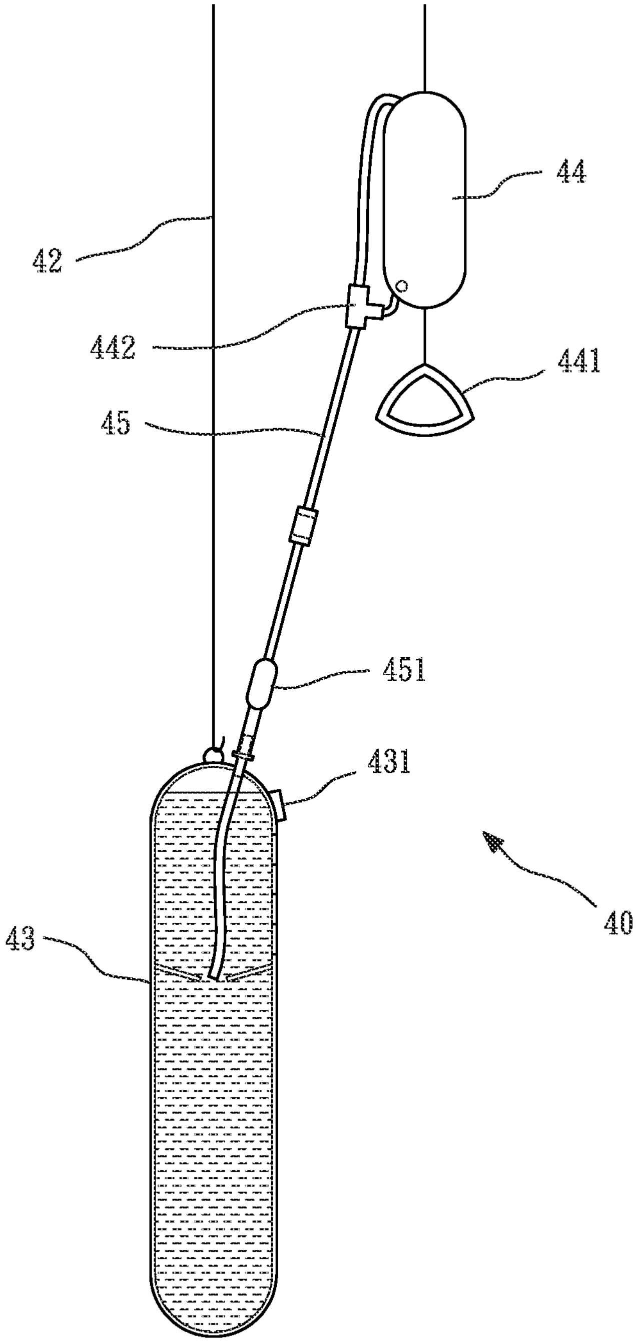
FIG. 10 is a schematic view showing a structure of the present invention including the counterweight device.

Referring to FIGS. 9 and 10, in an embodiment, each of the foot board units 20 is provided with a counterweight device 40. The counterweight device 40 comprises two hanging cable rings 41 that are mounted to the foot board unit 20, and a hanging cable 42 movably extending through the hanging cable rings 41 to set two ends thereof in a condition of being capable of moving upward/downward. A counterweight water bag 43 and a regulation water bag 44 are respectively arranged at the two ends of the hanging cable rings 41, and the counterweight water bag 43 and the regulation water bag 44 are connected to and in communication with each other by means of a water pumping tube 45. The counterweight water bag 43 is filled with water to serve as a counterweight and includes a water pumping activation switch 431. The regulation water bag 44 is provided, on a lower side thereof, with a pull ring 441 and a water return valve 442. The water pumping tube 45 is provided with a water pump 451 mounted thereto.

In an embodiment, the counterweight water bag 43 is provided, on a surface thereof, with a water level scale for observation of the water level in the counterweight water bag 43.

As such, the counterweight device 40 may function as a slow descending structure. An escaping person may handhold the pull ring 441 to pull and move the counterweight water bag 43, and the counterweight water bag 43 provides a slow descending force that resists the downward movement caused by the gravity of the escaping person so as to achieve an effect of slow descending and reduce the sense of fear and enhance safety.

Further, the escaping person may adjust, according to the personal body weight, the corresponding weight of the counterweight water bag 43. In other words, if the body weight of the escaping person is relatively light, by operating the water pumping activation switch 431, the water pump 451 can be activated for a function of water pumping to draw a portion of the water from the counterweight water bag 43 through the water pumping tube 45 to the regulation water bag 44, in order to reduce the weight of the counterweight water bag 43 to correspond to the relatively light body weight of the escaping person.

Further, the water return valve 442 can be operated to have water return from the regulation water bag 44 back to the counterweight water bag 43 to adjust and increase the weight of the counterweight water bag 43 in order to correspond a relatively heavy body weight of an escaping person.

Figure 11:
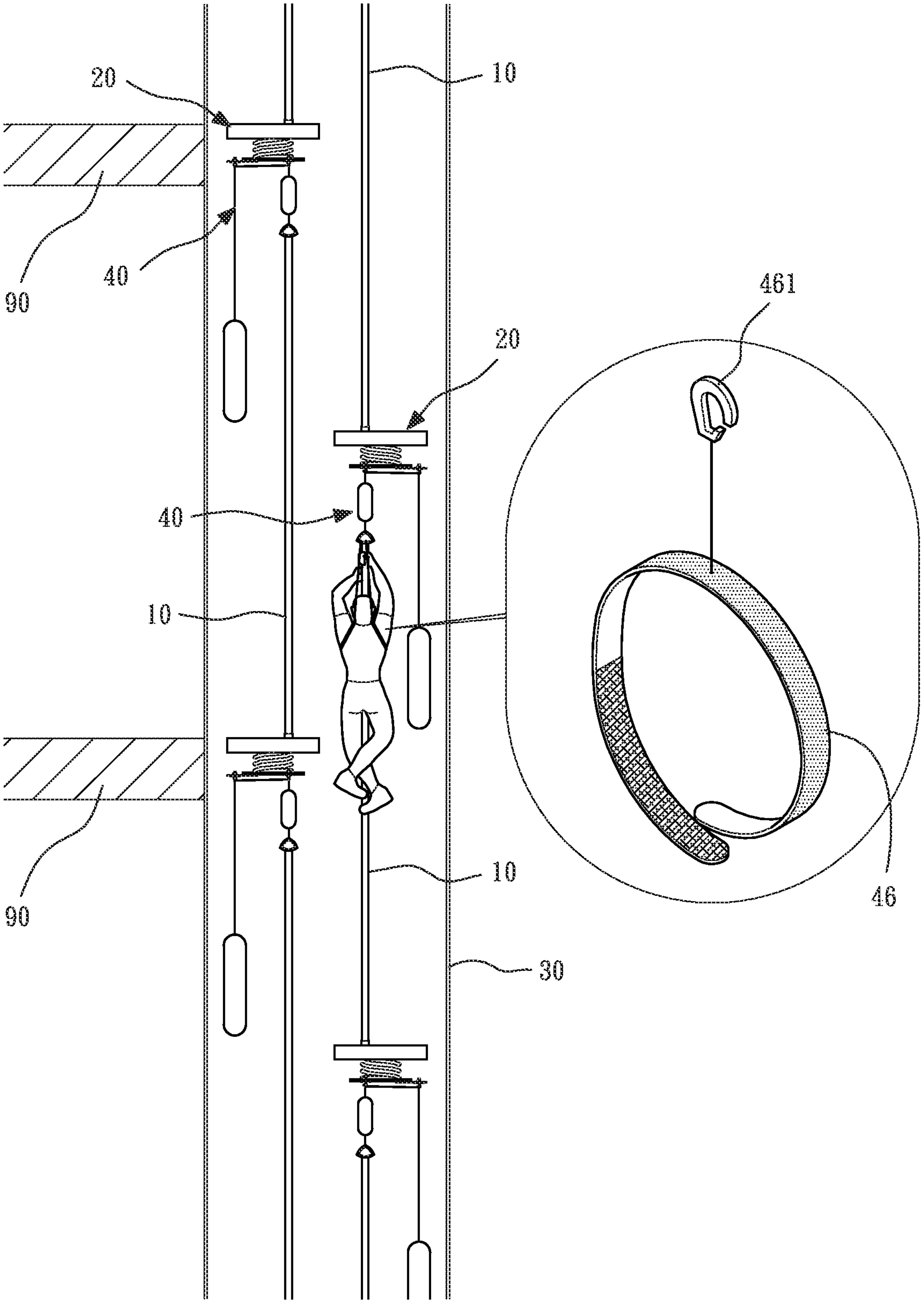
FIG. 11 is a view showing an example of use of the present invention including a suspension belt.

Referring to FIG. 11, in an embodiment, the pull ring 441 is provided with a suspension belt 46. An upper side of the suspension belt 46 is removably suspended, by means of a hook 461, on the pull ring 441. The suspension belt 46 is selected as a hook-and-loop fastening band structure.

In this way, an escaping person having a weak hand holding power, such as children, the aged, and women, may selectively attach, as desired, the suspension belt 46 to the body so that there is no need to apply any force by the hand, and this also provides the escaping person with an effect of slow descending and reducing fear and enhancing safety.

In summarization of the above description, the present invention provides at least the following advantages:

(1) The invention has high mobility, allows for quick escape, and an escaping person only needs to demonstrate the human being nature of moving, requiring no special skills (such as high sky climbing or abseiling).

(2) The invention allows multiple persons in multiple floors to synchronously escape.

(3) The invention requires no complicated pre-arrangement operation and the escaping person requires no special tools.

(4) Escape is not influence by any unknown facility of a building (or a structure).

(5) The invention allows the weak to be assisted for escape simultaneously.

(6) The invention has a simple structure and does not malfunction during the course of operation.

(7) The invention is not constructed and installed by using special objects or special construction method, and can be built with regular steel components in a way similar to the construction of a sheet metal house.

(8) The invention provides a counterweight water bag, which, in case of necessity, can serve as a measure of self-rescue and rescuing other people.

(9) The invention does not cause falls that endanger lives due to escaping person becoming exhausted during the course of escape.

(10) The positional arrangement of the foot board units allows an escaping person, after escaping from a fire floor, to get back into the building (the structure) to then escape or leave from the building (structure) by using the stairways of the building (structure).

(11) The control door of the surround cover unit may be set in operative connection with a fire alarm device, so as to automatically unlock when a fire alarm is issued.

(12) The invention may have a function of lighting on power failure and fluorescent lighting on main equipment to help escape at nighttime.

(13) The invention provides a function of closing the eyesight blocking the view in order to reduce an escaping person's fear for high sky of heights.

I claim:

1. An escape structure, which is applicable to an external wall of a building, the escape structure comprising:

at least two slide bars, which are mounted to the external wall of the building, the two slide bars being spaced from each other by a distance;

a plurality of foot board units, which are mounted to the slide bars, the foot board units being arranged on the two slide bars in an alternate manner; and a surround cover unit, which surrounds the slide bars to form an escape space, one side of the surround cover unit corresponding to an escaping site of the building for allowing an escaping person to enter and be constrained in the escape space;

wherein each of the slide bars is formed in a sectioned arrangement to form sites between the sections to mount the foot board units, and each of the foot board units comprises a bottom plate, an elastic body, and a foot board, wherein the bottom plate comprises a joining tube mounted thereto by penetrating therethrough, such that upper-end and lower-end parts of the joining tube respectively form an upper section portion and lower section portion respectively projecting from upper and lower sides of the bottom plate and the upper section portion and the lower section portion of the joining tube are respectively joined to separate sections of the slide bar, wherein the elastic body is arranged on the bottom plate, and the foot board is fit over the upper section portion of the joining tube and arranged on the elastic body, such that when the foot board receives a pressing force acting thereon, the elastic body presents a rebounding force through a spring force thereof, one side of the bottom plate being fixedly mounted to the external wall of the building so as to fix the slide bars to the external wall of the building.

2. The escape structure according to claim 1, wherein the foot board is mounted through fitting, in a sleeving manner, over the upper section portion of the joining tube at a location distant from a center of the foot board.

3. The escape structure according to claim 1, wherein the elastic body is a compression spring.

4. The escape structure according to claim 1, wherein the escaping site of the building is a balcony, and the balcony is provided with a control door that is selectively openable/closable, so that upon opening, the control door is set in connection with and makes access to the surround cover unit.

5. The escape structure according to claim 1, wherein the surround cover unit is in the form of a grid frame including multiple control doors that are openable/closable to selectively allow an escaping person to enter or exit.

6. The escape structure according to claim 1, wherein the surround cover unit has a top plan view shape that is one of a triangle, a rectangle, or a circle.

7. The escape structure according to claim 1, wherein each of the foot board units is provided with a counterweight device, the counterweight device comprising two hanging cable rings mounted to the foot board unit and a hanging cable movably extending through the hanging cable rings and having two ends set in a condition of being movable upward/downward, a counterweight water bag and a regulation water bag being respectively arranged at the two ends of the hanging cable rings, the counterweight water bag and the regulation water bag being connected to and in communication with each other by means of a water pumping tube, wherein the counterweight water bag is filled with water to serve as a counterweight and comprises a water pumping activation switch, and the regulation water bag is provided, on a lower side thereof, with a pull ring and a water return valve, the water pumping tube being provided with a water pump mounted thereto.

8. The escape structure according to claim 7, wherein the counterweight water bag is provided, on a surface thereof, with a water level scale for observation of a water level in the counterweight water bag.

9. The escape structure according to claim 7, wherein the pull ring is provided with a suspension belt, and an upper side of the suspension belt is removably suspended, by means of a hook, on the pull ring, wherein the suspension belt is a hook-and-loop fastening band structure.

* * * * *